United States Patent
Terashima

(10) Patent No.: US 11,215,835 B2
(45) Date of Patent: Jan. 4, 2022

(54) OPTICAL DEVICE AND WEARABLE DISPLAY DEVICE

(71) Applicant: SEIKO EPSON CORPORATION, Tokyo (JP)

(72) Inventor: Yasuhiro Terashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/003,996

(22) Filed: Aug. 27, 2020

(65) Prior Publication Data
US 2021/0063748 A1 Mar. 4, 2021

(30) Foreign Application Priority Data

Aug. 29, 2019 (JP) .............................. JP2019-156442

(51) Int. Cl.
*G02B 27/01* (2006.01)
*G02B 6/26* (2006.01)
*G02B 6/44* (2006.01)

(52) U.S. Cl.
CPC ............ *G02B 27/0172* (2013.01); *G02B 6/26* (2013.01); *G02B 6/4439* (2013.01); *G02B 2027/0138* (2013.01); *G02B 2027/0178* (2013.01)

(58) Field of Classification Search
CPC ............ G02B 27/0172; G02B 27/0176; G02B 6/4439; G02B 6/26; G02B 2027/0138; G02B 2027/0178
See application file for complete search history.

(56) References Cited

U.S. PATENT DOCUMENTS

| | | | | |
|---|---|---|---|---|
| 7,936,519 | B2 * | 5/2011 | Mukawa ................ | G03B 21/26 359/630 |
| 8,907,865 | B2 * | 12/2014 | Miyawaki .......... | G02B 27/0172 345/7 |
| 9,454,011 | B2 * | 9/2016 | Hiraide .................. | G02B 27/01 |
| 9,836,120 | B2 * | 12/2017 | Kobayashi .............. | G06F 3/013 |
| 10,133,407 | B2 * | 11/2018 | Kojima .................... | G06F 3/012 |
| 10,203,497 | B2 * | 2/2019 | Kamakura .......... | G02B 27/0006 |
| 10,334,212 | B2 * | 6/2019 | Yin ........................ | G02C 11/10 |
| 2012/0280903 | A1 * | 11/2012 | Fink .................... | G02B 27/0093 345/156 |
| 2013/0120224 | A1 * | 5/2013 | Cajigas .................... | G09G 5/00 345/8 |
| 2015/0185477 | A1 * | 7/2015 | Hiraide ................ | G02B 27/017 345/8 |
| 2015/0185481 | A1 * | 7/2015 | Hiraide .............. | G02B 27/0172 359/630 |
| 2015/0192777 | A1 * | 7/2015 | Bae ........................ | G06F 3/013 345/175 |

(Continued)

FOREIGN PATENT DOCUMENTS

JP 2017212475 11/2017

*Primary Examiner* — Ricardo Osorio
(74) *Attorney, Agent, or Firm* — JCIPRNET

(57) ABSTRACT

A transparent light-guiding unit for guiding imaging light, a positioning portion provided at the transparent light-guiding unit, a camera for performing space detection of an external space, and a camera holder that contacts the positioning portion and is attached to the transparent light-guiding unit, and holds the camera are provided. In this case, the camera holder contacts the positioning portion, thus, when the camera is attached to the transparent light-guiding unit, high positional accuracy is reliably maintained.

13 Claims, 12 Drawing Sheets

(56) References Cited

U.S. PATENT DOCUMENTS

2015/0358614 A1* 12/2015 Jin .................. H04N 13/339
                                                      348/49
2018/0249086 A1*  8/2018 Ozawa ............... G09G 3/002
2019/0079590 A1*  3/2019 Tomizawa ......... G02B 27/0172

* cited by examiner

OPTICAL DEVICE AND WEARABLE DISPLAY DEVICE

The present application is based on, and claims priority from JP Application Serial Number 2019-156442, filed Aug. 29, 2019, the disclosure of which is hereby incorporated by reference herein in its entirety.

BACKGROUND

1. Technical Field

The present disclosure relates to an optical device that can be applied to a wearable display device that presents a virtual image to an observer, and a wearable display device using the same.

2. Related Art

For example, a device has been known that can constitute a head-mounted display (HMD), an aspect of a wearable display device, in which a front imaging camera is provided within a housing provided associated with a light-guiding member for guiding imaging light, and relationships of position, angle, and the like between the camera and the light-guiding member is adjusted by an adjustment mechanism provided at a frame (JP-A-2017-212475).

In the device of JP-A-2017-212475, the camera is fixed to the housing disposed on an upper side of the light-guiding member, and the housing is a separate member from the light-guiding member. Furthermore, the housing constitutes an image display unit that is supported by an eyeglass-shaped frame. In this case, depending on a configuration of the housing and other components, there is a possibility that, by influence of manufacturing tolerances, assembly tolerances, and the like, shifting occurs between a display image range and an imaging range by the camera, and, for example, in a case of a so-called see-through type, accuracy lowers when a display image is superimposed on an external space image viewed by a wearer.

SUMMARY

An optical device in one aspect according to the present disclosure includes a light-guiding member configured to guide imaging light, a positioning portion provided at the light-guiding member, a space detection sensor configured to perform space detection of an external space, and a sensor fixing member attached to the light-guiding member in contact with the positioning portion and configured to hold the space detection sensor.

DESCRIPTION OF EXEMPLARY EMBODIMENTS

First Exemplary Embodiment

Hereinafter, one example of an optical device and a wearable display device including the optical device according to a first exemplary embodiment of the present disclosure will be described with reference to the accompanying drawings.

Figure 1:
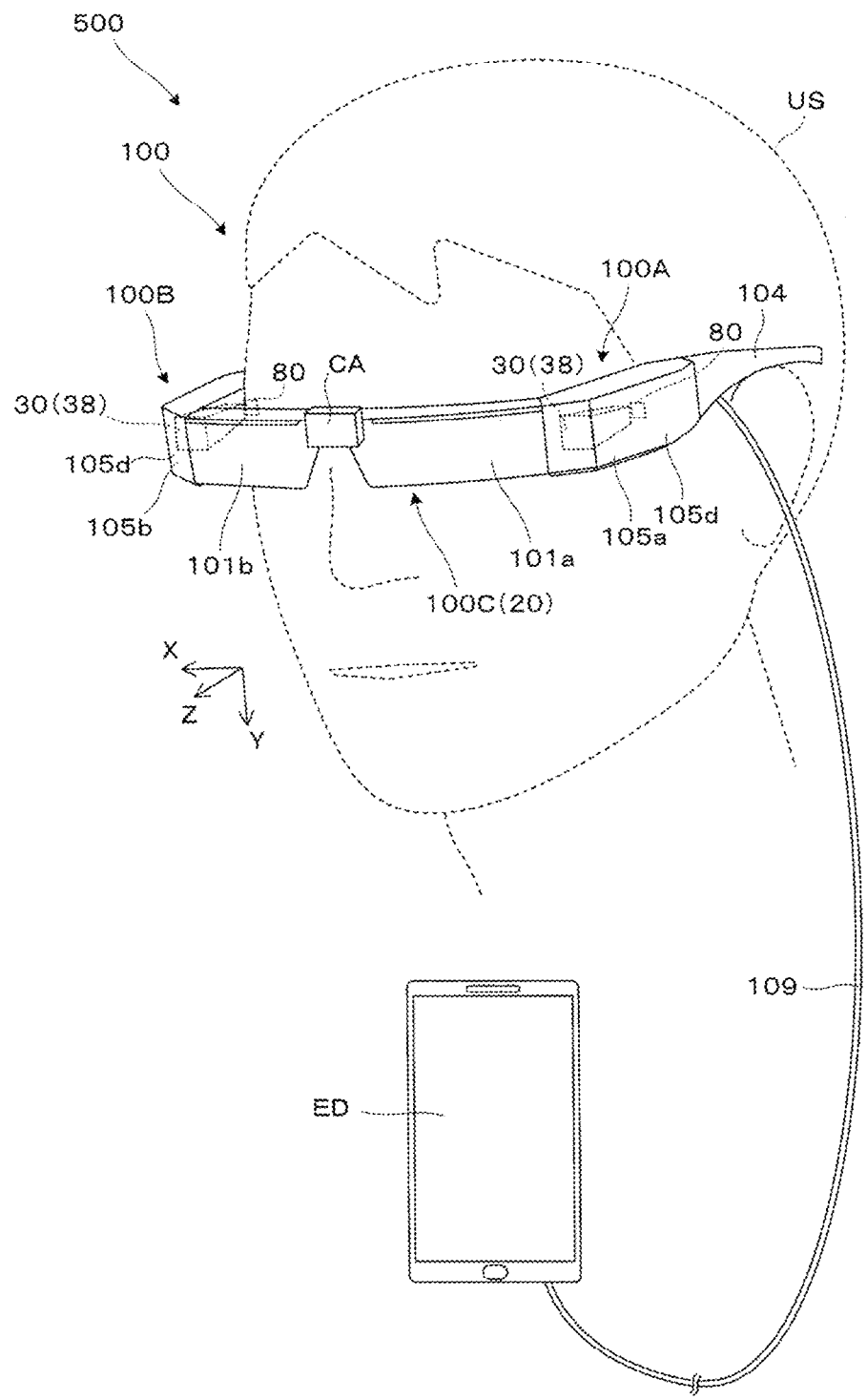
FIG. 1 is a perspective view for explaining a state of use of an optical device and a wearable display device including the optical device according to a first exemplary embodiment.
Figure 2:
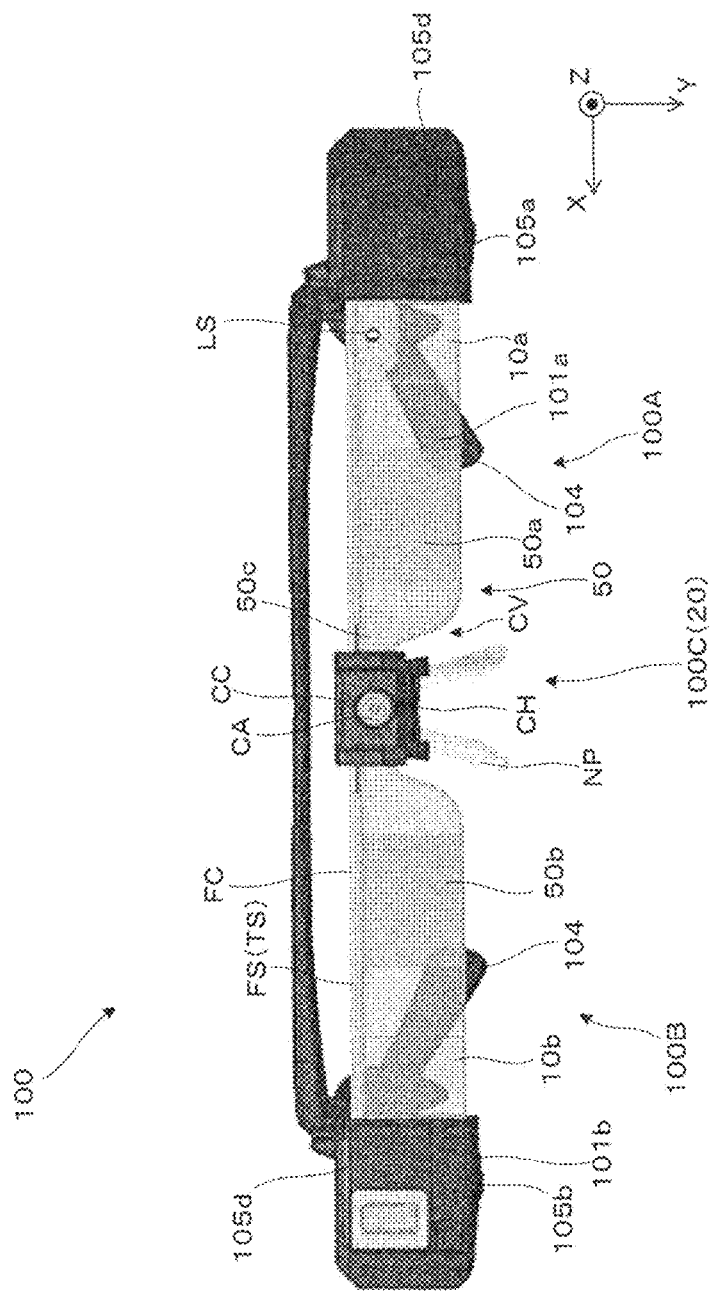
FIG. 2 is a front view illustrating one specific example of an appearance of the optical device.

As illustrated in FIG. 1, FIG. 2, and the like, an optical device 100 or a wearable display device 500 including the optical device 100 according to the present exemplary embodiment is a head-mounted display (HMD) having an eyeglass-like appearance. In FIG. 1 and the like, X, Y, and Z constitute an orthogonal coordinate system, a +X direction corresponds to a lateral direction in which both eyes of an observer wearing the optical device 100 are aligned, a +Y direction corresponds to a downward direction orthogonal to the lateral direction in which both the eyes of the observer are aligned, and a +Z direction corresponds to a front direction or a front surface direction for the observer.

As illustrated in FIG. 1 and the like, the optical device 100 can not only make an observer or a wearer US of wearing this optical device 100 to visually recognize a virtual image, but also make an external space image to be observed in a see-through manner. The optical device 100 can be communicatively connected to an external device ED such as a smart phone or the like, via a harness 109, and can form a virtual image corresponding to an image signal inputted from the external device ED, for example. Note that, in the following, for convenience of description, the optical device 100 will be treated as the above described virtual image display device for making a virtual image visible, and the wearable display device 500 will be treated as a device configured by the optical device 100 as described above, and a device for inputting image contents such as the external device ED. In other words, a device including, in addition to the optical device 100, the external device ED or a portion equivalent thereto as well will be referred to as the wearable display device 500. However, the present disclosure is not limited thereto, and the optical device 100 itself may also be the wearable display device 500. In other words, a part from the above-described components excluding the external device ED, to the harness 109 may also be regarded as the wearable display device 500. In any event, the configuration from the above-described components to the harness 109 can be regarded as an optical unit constituting an optical device or a wearable display device.

The optical device 100 is provided with a first display device 100A, a second display device 100B, and a camera CA. Of these, the first display device 100A and the second display device 100B are portions that respectively form a virtual image for a left eye and a virtual image for a right eye. The first display device 100A for the left eye includes a first virtual image forming optical unit 101a that covers a front of the eye of the observer, and through which the observer can see, and a first image forming body unit 105a that forms imaging light. The second display device 100B for the right eye includes a second virtual image forming optical unit 101b that covers the front of the eye of the observer, and through which the observer can see, and a second image forming body unit 105b that forms imaging light. In other words, an image corresponding to the left eye is displayed, by the first display device 100A, and an image corresponding to the right eye is displayed by the second display device 100B.

A temple 104, extending rearward from a side surface of a head, is attached to a back portion of each of the first and second image forming body units 105a and 105b, and secures a state in which the optical device 100 is worn in contact with an ear, a temple, or the like, of the observer.

In addition, as illustrated in FIG. 2 and the like, a camera CA is attached together with a nose pad NP, in a depression CV formed as a depressed portion that is bored between the first and second virtual image forming optical units 101a and 101b. The camera CA, in order to superimpose a display image on an external space image viewed by the wearer US, images an image of the external space to perform space detection of the external space. In other words, the camera CA functions as a space detection sensor. The nose pad NP, together with the temple 104, constitutes a support portion of an entirety of the device for the wearer US. That is, the nose pad NP enables positioning of the virtual image forming optical units 101a, 101b, or the like with respective to the eyes of the observer.

The camera CA and the nose pad NP are supported by a camera holder CH as a sensor fixing member that holds the camera CA (space detection sensor), and are attached to a central member 50 of a transparent light-guiding unit 100C that integrates the first display device 100A and the second display device 100B.

The camera holder CH is a resin member that is integrally molded, and is a member for housing the camera CA as the space detection sensor. In addition, the camera holder CH contacts a positioning portion provided at the central member 50, so that a position of the camera CA with respect to the transparent light-guiding unit 100C can be maintained with high accuracy. Note that, the transparent light-guiding unit 100C, and the central member 50 constituting this unit will be described below. Additionally, the attachment of the camera CA by the camera holder CH and the like will also be described below. Note that, to rephrase from a perspective of the nose pad NP, the camera holder CH also functions as pad support device that supports the nose pad NP.

Figure 8:
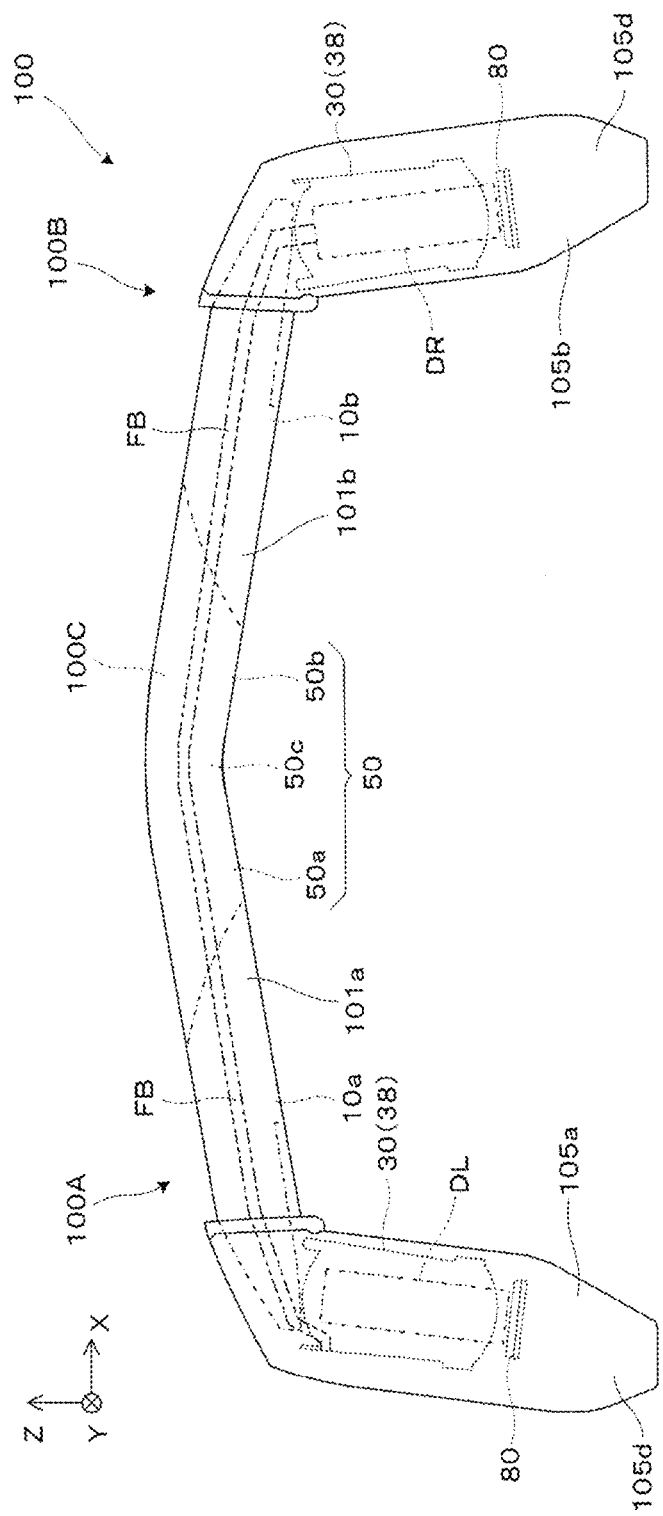
FIG. 8 is a plan view illustrating an optical configuration of the optical device.

Of the first and second display devices 100A and 100B, the first and second virtual image forming optical units 101a and 101b include first and second light-guiding members 10a and 10b respectively, that are light guides (light-guiding optical systems) formed of a resin material and the like, and are coupled at a center by the central member 50 as an integral member, to form the transparent light-guiding unit 100C. In other words, the transparent light-guiding unit 100C is a light-guiding unit that includes a pair of the light-guiding members 10a and 10b, and the central member 50. The pair of light-guiding members 10a and 10b are a pair of optical members, and are light-guiding optical systems that constitute the first and second virtual image forming optical units 101a and 101b respectively, and contribute to virtual image formation while each propagating imaging light inside thereof. The central member 50 has a pair of light transmission portions 50a and 50b, and a bridge portion 50c that couples the light transmission portions, and is an integrally molded component formed of a resin material or the like, and the pair of light transmission portions 50a and 50b are bonded to the pair of light-guiding members 10a and 10b respectively, to function as a coupling member that couples the first display device 100A and the second display device 100B to each other. More specifically, in the central member 50, the light transmission portion 50a, that is one of the pair of light transmission portions 50a and 50b, is bonded to the light-guiding member 10a, and the light transmission portion 50b that is another is bonded to the light-guiding member 10b. Note that, in the present exemplary embodiment, as illustrated in FIG. 8 for example, of the central member 50, a portion from the bridge portion 50c to the light transmission portion 50a and a portion from the bridge portion 50c to the light transmission portion 50b, are smoothly coupled to each other such that a curved portion (folded portion) is not provided. Since a location such as a curved portion (folded portion) or a stepped portion is not present, an external space image is prevented from being seen as doubled.

The transparent light-guiding unit 100C, as a light-guiding device 20 that is a composite light-guiding optical system that provides images for both the eyes to the observer by light-guiding, is supported by outer packaging cases 105d at both end portions respectively, that is, on outer end sides of the respective light-guiding members 10a and 10b. As illustrated in FIG. 1 and FIG. 8, the outer packaging case 105d includes a display element 80, a lens barrel 38, and the like for forming an image therein. Furthermore, for the outer packaging case 105d, for example, a magnesium alloy or the like is used as a material.

For example, the display element 80 housed in the outer packaging case 105d of the first image forming body unit 105a is a display device that exits imaging light to form an image corresponding to a virtual image for the left eye, and is constituted by, for example, an organic EL display panel, a panel for an LCD, or the like. A projection lens 30 exits imaging light from the display element 80, and constitutes a part of an imaging system in the first virtual image forming optical unit 101a. As a part of the projection lens 30, the lens barrel 38 holds an optical element (not illustrated) for forming an image constituting the projection lens 30.

Note that, for the second image forming body unit 105b as well, the display element 80 housed in the outer packaging case 105d of the second image forming body unit 105b, and the projection lens 30 including the lens barrel 38 similarly function in order to form an image corresponding to a virtual image for the right eye.

Hereinafter, structure for attaching the camera CA and the like to the transparent light-guiding unit 100C will be described with reference to FIG. 3.

Figure 3:
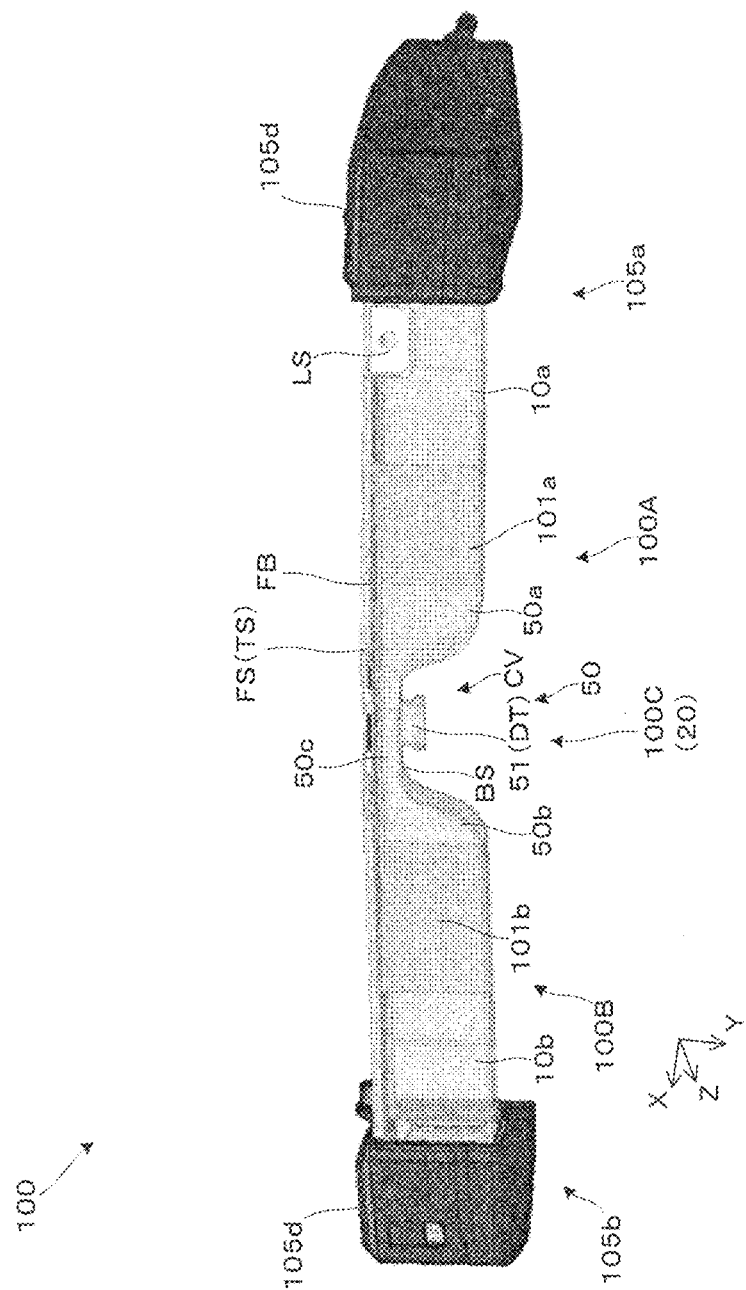
FIG. 3 is a perspective view illustrating one specific example of a state before attaching a camera as a space detection sensor or the like in the optical device.

In one example here, as illustrated in FIG. 3, in a state before the camera CA or the like (see FIGS. 1 and 2) is attached, in the central member 50, the bridge portion 50c includes a rib-like convex portion (rib-shaped portion) 51 that functions as a positioning portion DT for attaching the camera CA (see FIG. 2 and the like) at a location of the depression CV on a lower surface (surface on a +Y side) of the transparent light-guiding unit 100C. The convex portion 51 is provided, in the central member 50 as the coupling member, in the bridge portion 50c, so as to extend in a lateral direction in which the first light-guiding member 10a that is a first optical member, and the second light-guiding member 10b that is a second optical member are aligned, reinforces strength of the bridge portion 50c, and functions as the positioning portion DT that performs positioning of the camera holder CH with respect to the transparent light-guiding unit 100C, and the positioning when the camera CA and the nose pad NP are attached.

In the present exemplary embodiment, the convex portion 51 that functions as the positioning portion DT is prepared so as to have high positioning accuracy in the transparent light-guiding unit 100C that is required to be formed with high accuracy for light-guiding, and the camera holder CH is attached as a sensor fixing member that contacts this positioning portion DT and holds the camera CA as a space detection sensor. Thus, for example, the positioning portion DT or the convex portion 51 is provided at a center position of left-right symmetry between the first light-guiding member 10a and the second light-guiding member 10b. Accordingly, the positioning portion DT or the convex portion 51 is disposed with high accuracy in a center in display of left and right images. In other words, with the above structure, high positional accuracy can be reliably maintained, when the camera CA is attached to the transparent light-guiding unit 100C including the light-guiding members 10a and 10b.

In addition, of the above, it can be said that, when the above perspective is changed for the central member 50, in the central member 50, the pair of light transmission portions 50a and 50b bonded to the pair of light-guiding members 10a and 10b respectively are a pair of end portions, and the bridge portion 50c is a lateral intermediate portion sandwiched between the light transmission portions 50a and 50b as the pair of end portions. In addition, in this case, the convex portion 51 is provided at the lateral intermediate portion described above of the central member 50.

In the following, locations except for the above of the optical device 100 will be described. First, although illustration will be omitted, there is a need for a signal processing board that performs various signal processes, that is, image signal processes, such as image formation based on image data from the external device ED as described above, and image formation in accordance with an external space situation imaged by the camera CA. As a printed wired board for performing the above various processes, a main printed wired board for processing various signals including information from an outside, for example, is provided in the outer packaging case 105d. Similarly, a driving printed wired board that drives the display element 80 in each of the first and second image forming body units 105a and 105b corresponding to the left and right eyes respectively, additionally, a printed wired board for driving and controlling of the camera CA and the like are provided in the outer packaging case 105d.

In addition to the above, an illuminance sensor LS may be provided as illustrated in FIG. 2 and FIG. 3. The illuminance sensor LS is an ALS (Ambient Light Sensor) and is an outside light sensor that measures ambient light intensity suitable for reaction of the observer. Thus, in the illustrated example, the illuminance sensor LS is disposed in the +Z direction corresponding to the front direction or the front surface direction for the observer. The illuminance sensor LS, in order to enable detection of an amount of light entering the eye of the observer, operates under control of the main printed wired board, for example.

In addition, as illustrated in FIG. 2 and FIG. 3, for example, the transparent light-guiding unit 100C has, as an upper surface TS or a surface on a −Y side, a flat surface FS extending from the first display device 100A to the second display device 100B and flush with the devices.

Further, on an upper side of the upper surface TS of the transparent light-guiding unit 100C, as illustrated in FIG. 2, a cover member FC (FPC cover) is provided as a cover structure portion. A thin and narrow space is formed between the cover member FC and the transparent light-guiding unit 100C, and a cable FB extends that electrically couples the first image forming body unit 105a and the second image forming body unit 105b. Further, when the above perspective is changed, the central member 50 as the coupling member has a flat surface FS (upper surface TS) as an opposing surface (surface on the −Y side) to a lower surface BS (surface on the +Y side) provided with the convex portion 51, and the cable FB can be disposed on the flat surface FS. Thus, as a cable, a flexible substrate or an FPC (Flexible Printed Circuit) substrate can be employed. In other words, as illustrated, the flexible substrate FB can be wired as a cable. In addition, in the present exemplary embodiment, for the cable FB that electrically couples the camera CA or the like as well, an FPC substrate can be used. Thus, for the flexible substrate FB, as appropriate, for example, a plurality of wires may be stacked, or the flexible substrate FB may be constituted by a plurality of flexible substrates.

Figure 4:
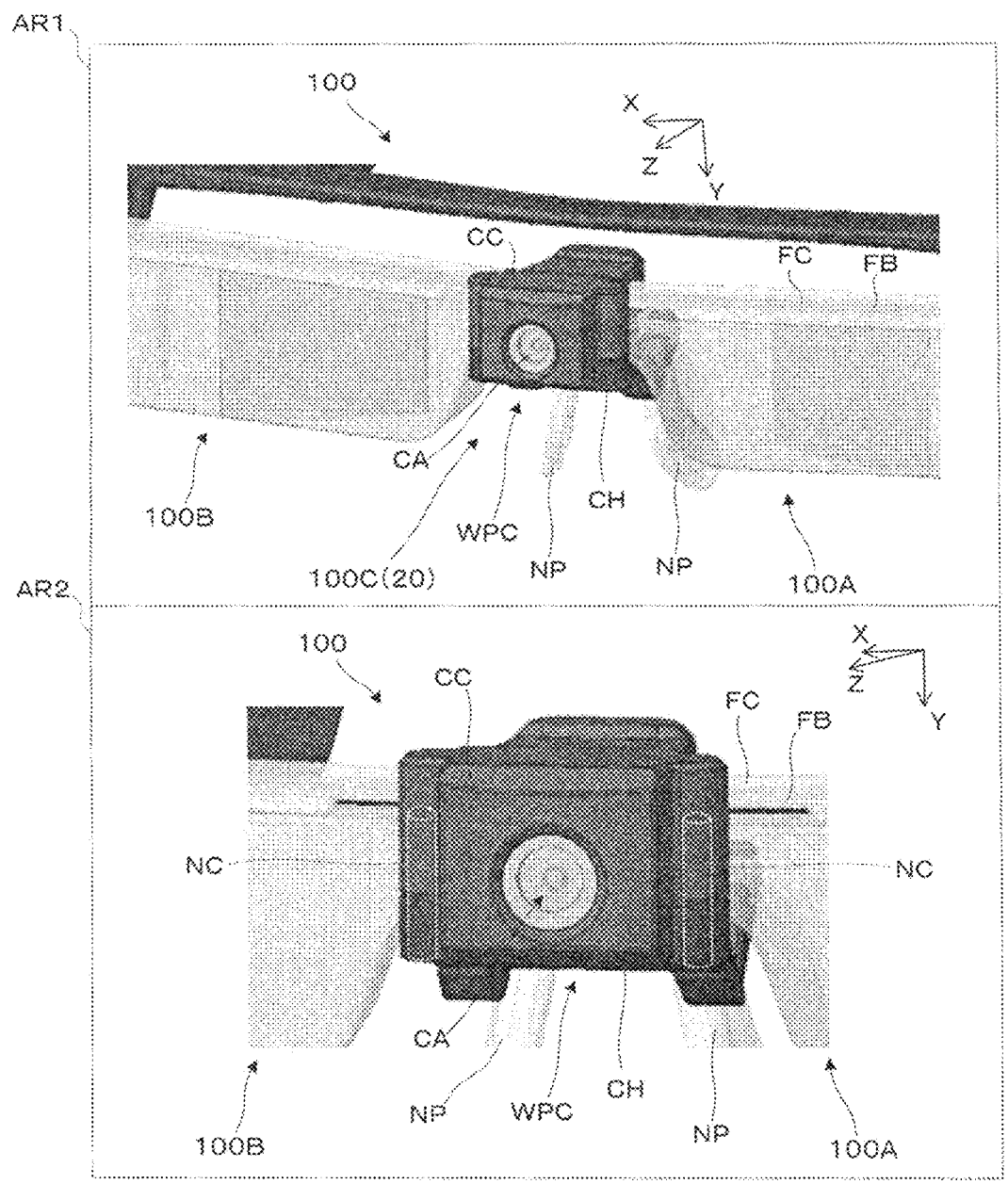
FIG. 4 is a partially enlarged perspective view of a portion of the appearance of the optical device including the camera as the space detection sensor.
Figure 5:
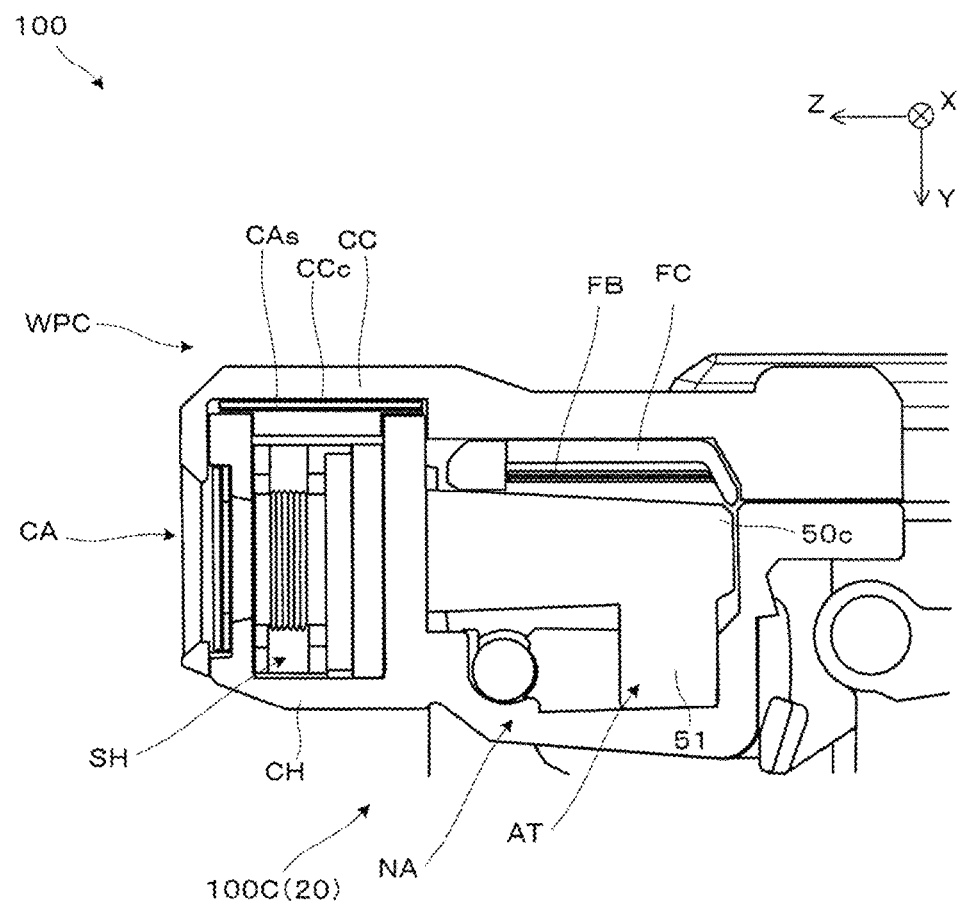
FIG. 5 is an enlarged cross-sectional side view of a portion of the optical device including the camera.

Hereinafter, with reference to FIG. 4 to FIG. 6, one example of the camera CA and the attachment thereof will be described in more detail. In FIG. 4, a first region AR1 is a partially enlarged perspective view of a portion of an appearance of the optical device 100 including the camera CA as the space detection sensor, and a second region AR2 is a further enlarged perspective view of the camera CA and a periphery thereof. Additionally, FIG. 5 is an enlarged cross-sectional side view of a portion of the optical device 100 including the camera CA. Further, FIG. 6 is a perspective view of the camera holder CH as the sensor fixing member.

The camera CA is an imaging camera constituted by an individual imaging element such as a CCD or a CMOS, for example, and images (captures) an external space image in accordance with a line-of-sight of the observer. In the optical device 100, by analyzing two-dimensional or three-dimensional image data acquired in the camera CA, an image corresponding to the external space (real object) or an external space image (real image), that the wearer US sees through and actually and visually recognizes, can be provided by the first and second display devices 100A and 100B. In other words, the camera CA functions as a space detection sensor for performing space detection of the external space.

From the above perspective, it is desirable that the camera CA is attached with high accuracy to the first and second display devices 100A and 100B that each form imaging light. Thus, in the present exemplary embodiment, the camera CA is attached and fixed to the first and second display devices 100A and 100B, by the camera holder CH that houses the camera CA and a camera cover member CC covering them. In particular, at this time, high accuracy required for the transparent light-guiding unit 100C is utilized to perform position fixing with high accuracy, and for an installation position on the way to and from a side of the camera CA at which imaging light is formed, not only a tolerance during manufacturing, but also a tolerance generated after start of using the optical device 100, are suppressed. This enables image formation and maintenance of the image formation, with high consistency with positions in the external space.

Figure 6:
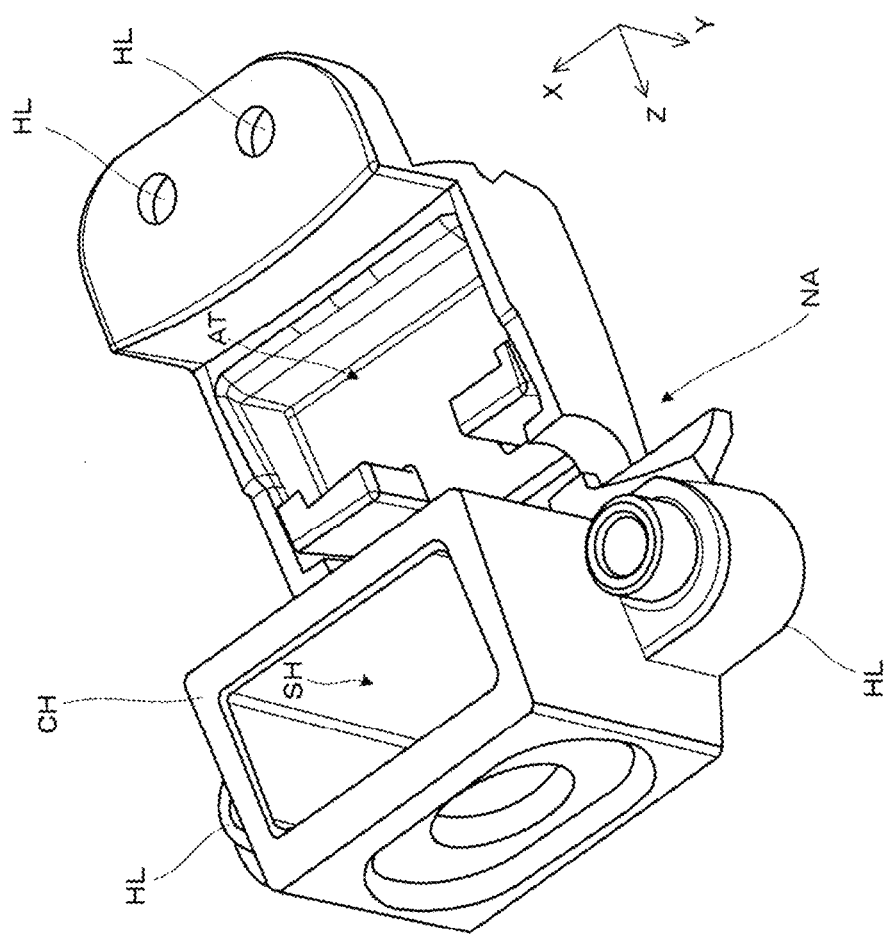
FIG. 6 is a perspective view of a camera holder as a sensor fixing member.

As described above, the camera holder CH is the resin member that is integrally formed, and as illustrated in FIG. 5 and FIG. 6, has an attachment portion AT that is in contact with and attached to the convex portion 51, that is the positioning portion DT provided at the central member 50, a housing-shaped storage portion SH for storing the camera CA, and a nose pad attachment portion NA for attaching the nose pad NP. In other words, the attachment portion AT, the storage portion SH, and the nose pad attachment portion NA are integrally molded into a component. In addition, the camera holder CH includes screw holes HL for screw tightening and fixing with the camera cover member CC. In the illustrated example, four number of the screw holes HL are provided.

Here, in the camera holder CH, the storage portion SH is designed using dimensions such that there is almost no clearance, in order to house the camera CA. Accordingly, in conjunction with being integrally formed, occurrence of a tolerance between the attachment portion AT and the storage portion SH is suppressed as much as possible.

Furthermore, the attachment portion AT, for an XY plane orthogonal to the +Z direction and a −Z direction and a YZ plane orthogonal to the +X direction and a −X direction, contacts each surface of the convex portion 51 direction. Note that, one example of a contact surface (reference surface) of the convex portion 51 will be described with reference to FIG. 7.

The attachment of the camera CA by the camera holder CH and the like will be described below. For example, as illustrated in the first region AR1 and the second region AR2 in FIG. 4, the camera CA is supported by the camera holder CH from a lower side (the +Y side) and is covered from an upper side (the −Y side) with the camera cover member CC as a sensor cover. Furthermore, the camera cover member CC and the camera holder CH cooperate to clamp the camera CA. Specifically, as illustrated in the second region AR2 in FIG. 4, screw holes (such as the screw holes HL) are provided in the camera cover member CC and the camera holder CH, the camera CA is screwed and fixed with a screw NC extending in a height direction, that is, in the +Y direction and a −Y direction, and thus is clamped in these directions. Further, accordingly, positioning in the ±Y directions orthogonal to a ZX plane is also performed.

In addition, as illustrated in FIG. 5, with respect to a periphery of the camera CA, with a sheet member CAs for sealing sandwiched between the storage portion SH of the camera holder CH and a storage lid portion CCc of the camera cover member CC, the above screwing and fixing is performed, thus the camera CA is brought into a state of being sealed inside the storage portion SH and provided with waterproofing measures. In other words, in the above description, the sheet member CAs is provided between the camera holder CH and the camera cover member CC, and functions as a waterproof member crimped in conjunction with the attachment of the camera holder CH and the camera cover member CC by fastening. Note that, in the above description, the attachment of the camera holder CH and the camera cover member CC is the fastening by the screwing and fixing, however, this is an example, and when attachment having a desired crimping force is possible for the waterproof member, the attachment is not limited to the fastening, and attachment can be performed by various fixing methods such as clip fixing, and securing with a waterproof tape.

As described above, in the present exemplary embodiment, first, the camera CA is disposed in a center portion or between the first display device 100A and the second display device 100B (see FIG. 2 and the like). Accordingly, accuracy can be increased, for example, by an AR (augmented reality) function or the like. In other words, occurrence of shifting between a visual recognition direction of the wearer US and a camera image can be suppressed. If, the camera CA is disposed, for example, in a side direction of the second image forming body unit 105b or the like (see FIG. 2 and the like), there is a possibility that a decline in accuracy may be caused in the AR function or the like. Furthermore, when used by an observer with long head hair, hair may hang before a camera lens of the camera CA, which may cause a decline in function. In this configuration, by centrally disposing the camera CA, such a situation can be prevented or suppressed.

Furthermore, in the present exemplary embodiment, the camera CA is housed in the camera holder CH that is in contact with and attached to the positioning portion DT provided at the transparent light-guiding unit 100C serving as the light-guiding member, and thus the camera CA is attached with higher accuracy to the transparent light-guiding unit 100C. This makes it possible to further suppress occurrence of positional shifting between a result of external space detection in the camera CA, and an image visible by imaging light guided by the transparent light-guiding unit 100C. In this case, for example, when a display image is superimposed on an external space image viewed by the wearer using a see-through type, a state can be achieved in which respective positions of the external space image and a virtual image by the imaging light are highly consistent with each other. Thus, for example, AR (augmented reality) can be achieved in which an image with higher positional accuracy is added to an external space that is actually seen.

In addition, in the case of the present exemplary embodiment, the illuminance sensor LS, that is the outside light sensor, is close to a position of the eye of the wearer US. Accordingly, information acquired from these such as a line-of-sight and an amount of light entering the eye accurately reflects an external recognition situation by the observer. Thus, by utilizing the information, brightness of the external space can be accurately reflected upon image formation.

Figure 7:
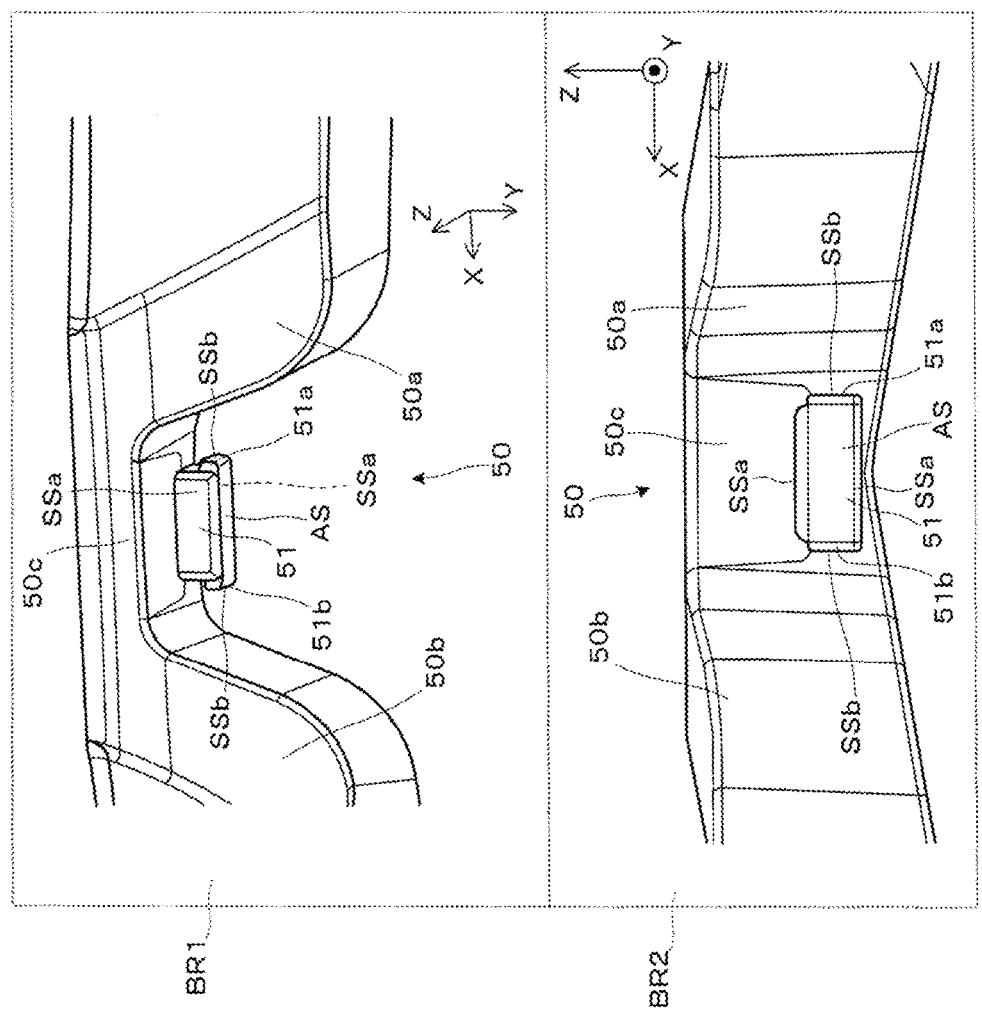
FIG. 7 is an explanatory diagram of a positioning portion of the optical device.

One example will be described below with reference to FIG. 7 for the positioning portion DT or the convex portion 51 and a location of a periphery thereof, of the optical device 100 as the optical device will be described.

As described above, the convex portion 51, as a part constituting the bridge portion 50c of the central member 50 that is the integrally molded component, protrudes to the +Y side in the lower surface BS or the surface on the +Y side, and extends in the lateral direction (see FIG. 4 and the like) in which the first light-guiding member 10a and the second light-guiding member 10b are aligned. In other words, the convex portion 51 extends in the ±X directions from the first light-guiding member 10a to the second light-guiding member 10b as extending directions. Note that, for example, as illustrated in a perspective view in a first region BR1 and a bottom surface view in a second region BR2, in FIG. 7, the convex portion 51 has a rib-like shape, and has a hook units 51a and 51b at both ends in the extending direction respectively. Note that, the hook units 51a and 51b are undercuts during formation, and are each formed by providing a slide core or the like in a formation mold as necessary during injection molding.

Furthermore, in the present exemplary embodiment, as illustrated in the figure, of the convex portion 51 having the shape described above, a first reference plane SSa parallel to the XY plane orthogonal to the ±Z directions, and a second reference plane SSb parallel to the YZ plane orthogonal to the ±X directions are contact surfaces with the attachment portion AT of the camera holder CH illustrated in FIG. 5 and FIG. 6, thereby enabling desired positioning.

Figure 9:
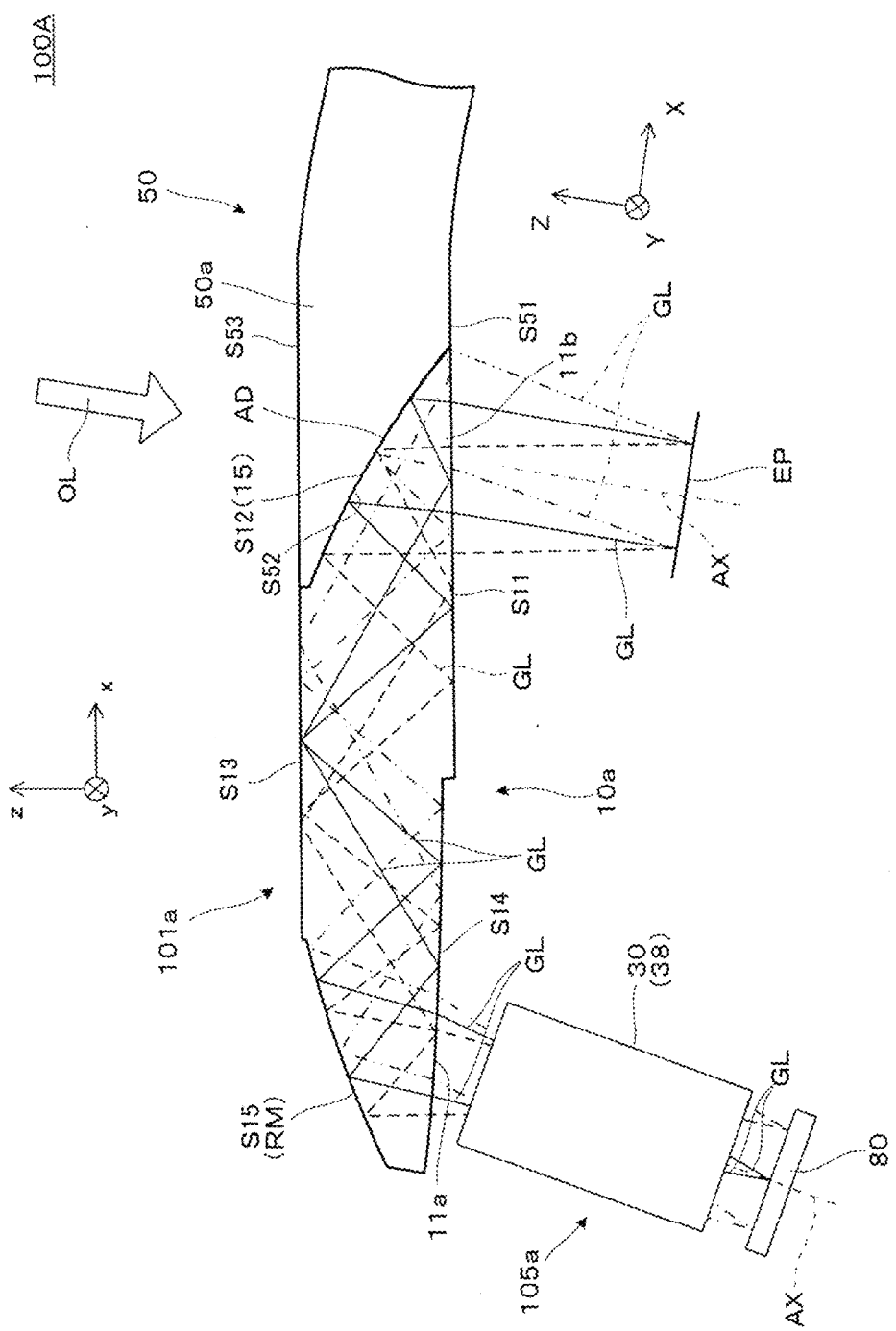
FIG. 9 is a plan view for explaining optical structure of the optical device.

In addition, in the case described above, the convex portion 51 is provided from the bottom surface BS or on the +Y side, and thus is formed at a position that does not nearly affect light-guiding of imaging light (see FIG. 8 and FIG. 9 described below). That is, the surface at which the convex portion 51 is formed is a surface that is not a surface of the light-guiding members 10a and 10b that contributes to the light-guiding of imaging light, and is a surface off from an extension of the light-guiding. Thus, it is possible to avoid or suppress occurrence of a situation in which, for example, components of imaging light not visually recognized are reflected at the convex portion 51 in an unintended manner, and affect visibility of the image light.

Note that, as described above, when a pair of the hook units 51a and 51b are provided at both the respective ends, for example, in a case of a configuration, different from this case, in which the camera CA is not provided, a configuration can be adopted in which a pad support device for attaching only the nose pad NP can be fixed using the hook units 51a and 51b.

Furthermore, the above is one example, and, as long as a shape with which the first reference plane SSa and the second reference plane SSb as described above can be formed is used, a configuration may also be adopted in which a shape like the hook units 51a and 51b is not provided. Furthermore, it is also conceivable that the positioning portion DT have a recessed shape having respective surfaces corresponding to the first and second reference surfaces SSa and SSb, for example, instead of the shape protruding from the first light-guiding member 10a, such as the convex portion 51.

Optical structure for the optical device 100 will be described below with reference to FIG. 8 and FIG. 9. FIG. 8 is a plan view illustrating an optical configuration of the optical device 100, and FIG. 9 is a diagram illustrating a part of the first display device 100A of the optical device 100, in particular, explaining optical structure of the first virtual image forming optical unit 101a. As described above, and as illustrated in FIG. 8, the optical device 100 is constituted by the first display device 100A and the second display device 100B, but the first display device 100A and the second display device 100B are left-right symmetric and equivalently structured, thus in the description referring to FIG. 9, only the first display device 100A will be described, and the description of the second display device 100B will be omitted. Note that, in FIG. 9, x, y, and z constitute an orthogonal coordinate system, and an x direction and a y direction are, of first to fifth surfaces S11 to S15 having an optical function upon light-guiding of imaging light in the light-guiding member 10a, parallel to the first surface S11 and the third surface S13, and a z direction is orthogonal to the first surface S11 and the third surface S13.

The light transmission portion 50a is integrally fixed to the light-guiding member 10a, and is a member that assists a transmission function of the light-guiding member 10a. The light transmission portion 50a has a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of the first surface S11 of the light-guiding member 10a, the second transmission surface S52 is a curved surface that is bonded to and integrated with the second surface S12, and the third transmission surface S53 is on an extended surface of the third surface S13 of the light-guiding member 10a.

The light-guiding member 10a of the first virtual image forming optical unit 101a is bonded to the light transmission portion 50a via an adhesive layer AD. In other words, the second transmission surface S52 of the light transmission portion 50a is disposed opposite to the second surface S12 of the light-guiding member 10a and has an identical shape. The light-guiding member 10a and the light transmission portion 50a have structure in which a surface of a body member that provides a stereoscopic shape including an optical surface is covered with a thin hard coat layer. The body member of the light-guiding member 10a and the light transmission portion 50a is formed from a resin material with high optical transparency in a visible range and is formed, for example, by injecting a thermoplastic resin into a mold and solidifying the resin.

Below, a summary of an optical path of imaging light GL will be described. The light-guiding member 10a guides the imaging light GL exited from the projection lens 30 toward the eye of the wearer US, by reflection at the first to fifth surfaces S11 to S15 and the like. Specifically, the imaging light GL from the projection lens 30 is first incident on a portion of the fourth face S14 formed at a light incidence part 11a and reflected by the fifth face S15 that is an inner surface of a reflection film RM, is incident again from an inner side on the fourth surface S14 and is totally reflected, is incident on and totally reflected by the third surface S13, and is incident on and totally reflected by the first surface S11. The imaging light GL totally reflected by the first surface S11 is incident on the second surface S12, is partially reflected while partially passing through a half mirror 15 provided at the second surface S12, and is again incident on and passes through a portion of the first surface S11 provided at a light emitting part 11b. The imaging light GL passing through the first surface S11 travels as a whole along an optical axis Ax that is substantially parallel to the Z direction, and is incident as a substantially parallel luminous flux on an exit pupil EP where the eye of the wearer US is disposed. In other words, the wearer US observes an image by imaging light as a virtual image.

The first virtual image forming optical unit 101a makes the wearer US visually recognize imaging light by the light-guiding member 10a, and, in a state in which the light-guiding member 10a and the light transmission portion 50a are combined with each other, makes the wearer US observe an external space image with little distortion. At this time, since the third surface S13 and the first surface S11 are surfaces substantially parallel to each other, diopter is approximately 0 with respect to observation for which this portion is transmitted, and almost no aberration or the like occurs in external space light OL. Further, the third transmission surface S53 and the first transmission surface S5l are flat surfaces that are substantially parallel to each other. Furthermore, since the first transmission surface S5l and the first surface S11 are flat surfaces that are substantially parallel to each other, almost no aberration or the like occurs. As described above, the wearer US observes an external space image without distortion through the light transmission portion 50a.

For example, in the light-guiding member 10a constituting the transparent light-guiding unit 100C, accuracy required for each light-guiding surface such as the first surface S11 as described above is, for example, approximately ±50 µm. In this case, compared to 0.4 mm required for a regular formed product, by utilizing surface accuracy equivalent to this with a very small tolerance, a tolerance in positional accuracy of the camera CA can be improved.

As described above, in the optical device 100 and the wearable display device 500 provided with the same according to the present exemplary embodiment, the transparent light-guiding unit 100C for guiding imaging light, the positioning portion DT provided at the transparent light-guiding unit 100C, the camera CA for performing space detection of an external space, and the camera holder CH that contacts the positioning portion DT, is attached to the transparent light-guiding unit 100C, and holds the camera CA are included. In this case, the camera holder CH contacts the positioning portion DT, thus, when the camera CA is attached to the transparent light-guiding unit 100C, high positional accuracy can be reliably maintained. This makes it possible to suppress occurrence of positional shifting between a result of external space detection in the camera CA, and an image visible by imaging light guided by the transparent light-guiding unit 100C. In this case, for example, when a display image is superimposed on an external space image viewed by the wearer US using a see-through type, a state can be achieved in which respective positions of the external space image and a virtual image by the imaging light are highly consistent with each other.

Figure 10:
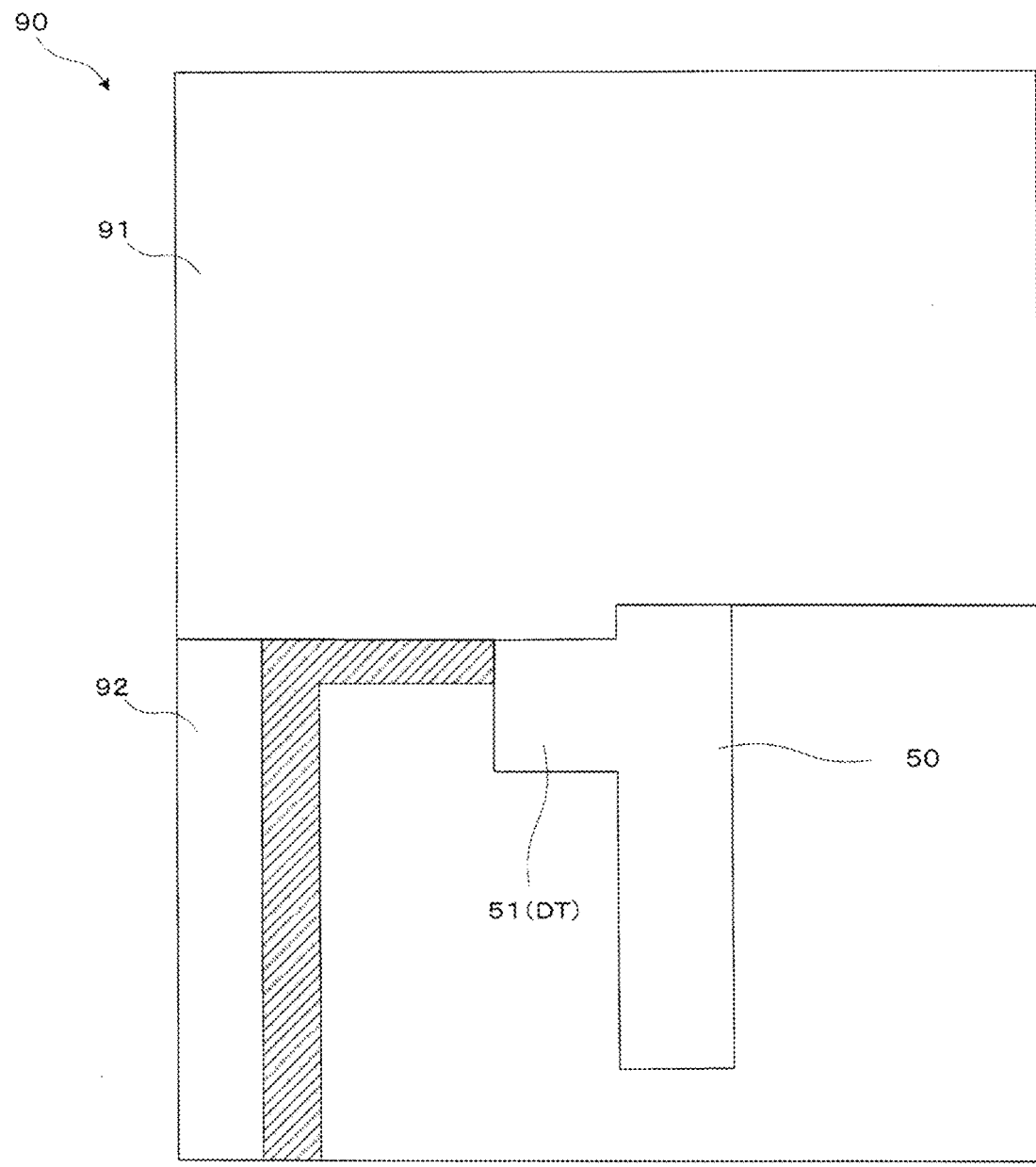
FIG. 10 is a cross-sectional view for explaining formation of a portion including a convex portion.

Hereinafter, with reference to a cross-sectional view illustrated in FIG. 10, formation of a portion of the central member 50 that includes the convex portion (rib-shaped portion) 51, that is, a portion including the positioning portion DT will be described. As described above, the central member 50 is the resin member formed by the injection molding, and as illustrated, the convex portion 51 is a gate portion during the injection molding for the central member 50. In particular, in the illustrated example, a part of a lower end face of the convex portion 51, that is, a location that becomes a surface on the +Y side (lower surface) after the formation is a gate. By using the convex portion 51 positioned at a center of left-right symmetry of the central member 50 as the gate, a resin flow can be improved, to spread a resin material across an entire mold.

A formation mold 90 is constituted by, for example, including a first mold 91 and a second mold 92, and by clamping the first mold 91 and the second mold 92 to perform mold clamping for both the molds 91 and 92, a resin formation member PP to be the central member 50 can be formed. In other words, in a state in which the mold clamping is performed, by flowing a molten resin into an internal space formed in both the molds 91 and 92 from a gate that is an inlet of the resin, and by appropriately performing operations such as heating, cooling, pressing, depressurizing, and the like, the resin formation member to be the central member 50 is formed in the internal space. Note that, while a detailed description will be omitted, in accordance with a request for mold release, a taper is provided as appropriate in each portion, or due to presence of an undercut, both the molds 91 and 92 are further divided into multiple molds, in some cases. In the above case, a coupling member can be formed with high accuracy, and the convex portion 51 can be integrally formed with the other portions that constitute the central member 50.

As described above, by integrally forming the convex portion 51, that is to be the positioning portion DT with respect to the camera CA, with a portion to be a light-guiding optical system or a portion that is bonded to this portion directly and with high accuracy, positioning of the camera CA with respect to the light-guiding optical system can be achieved with high accuracy.

Figure 11:
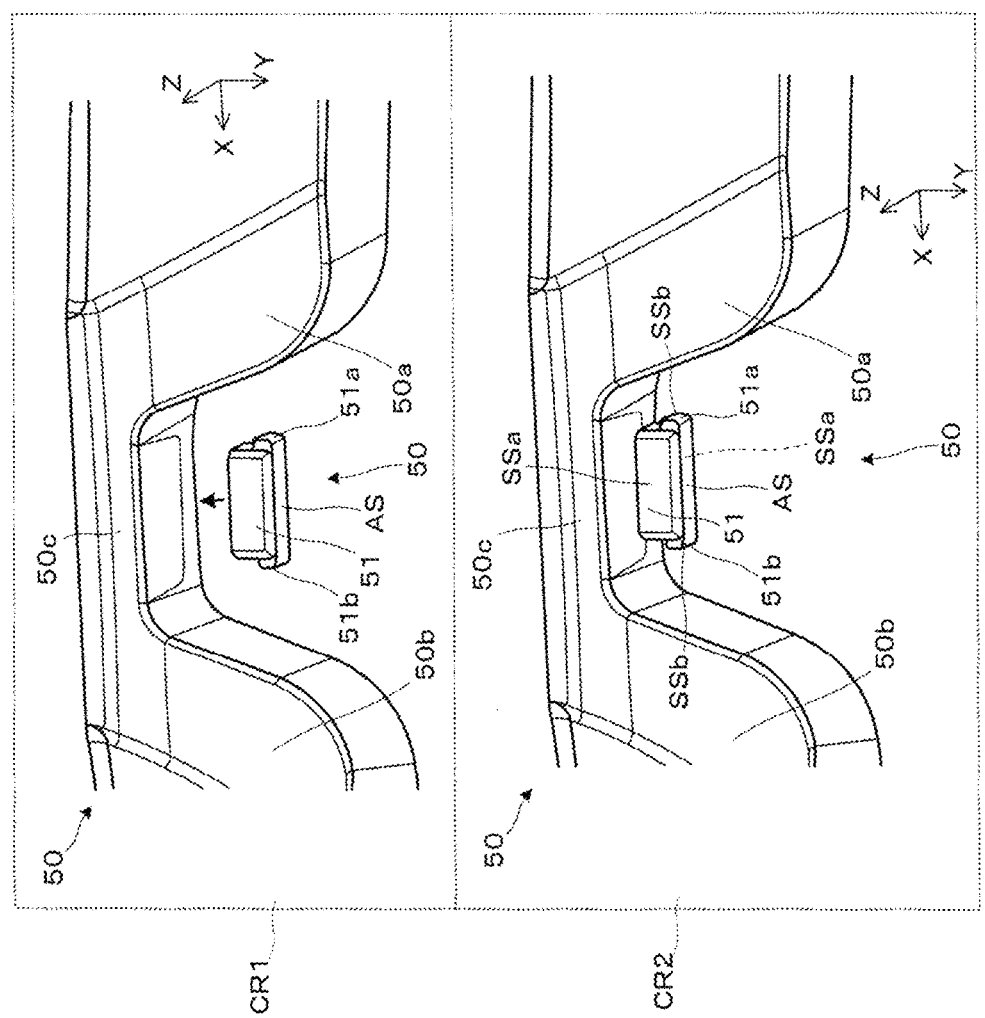
FIG. 11 is an explanatory diagram of an optical device according to one modified example.

Hereinafter, the optical device 100 of one modified example will be described with reference to FIG. 11. Note that, FIG. 11 is a diagram corresponding to the first region BR1 in FIG. 7. In the example described above, the convex portion 51 is integrally formed, but as illustrated in FIG. 11, as long as required accuracy can be maintained, the convex portion 51 may be a separate member that is attached and fixed to the central member 50. In other words, as illustrated in a first region CR1 in FIG. 11, when the central member 50 is produced, the convex portion 51 is not provided, and the convex portion 51 is separately produced from the central member 50, and as illustrated in a second region CR2, the convex portion 51 may also be subsequently added to a suitable location of the central member 50 by adhesive fixing or the like. In other words, in the production of the central member 50, as the convex portion 51, a portion having required accuracy or the like may be subsequently added.

Second Exemplary Embodiment

Hereinafter, an optical device according to a second exemplary embodiment will be described with reference to FIG. 12. Note that, the optical device according to the present exemplary embodiment is a modified example of the optical device 100 according to the first exemplary embodiment, and differs from the case of the first exemplary embodiment, in that, the optical device is configured to include, as a space detection sensor, a plurality of detection units. However, other points are similar to those in the first exemplary embodiment, and thus detailed descriptions will be omitted for each component other than those described above.

Figure 12:
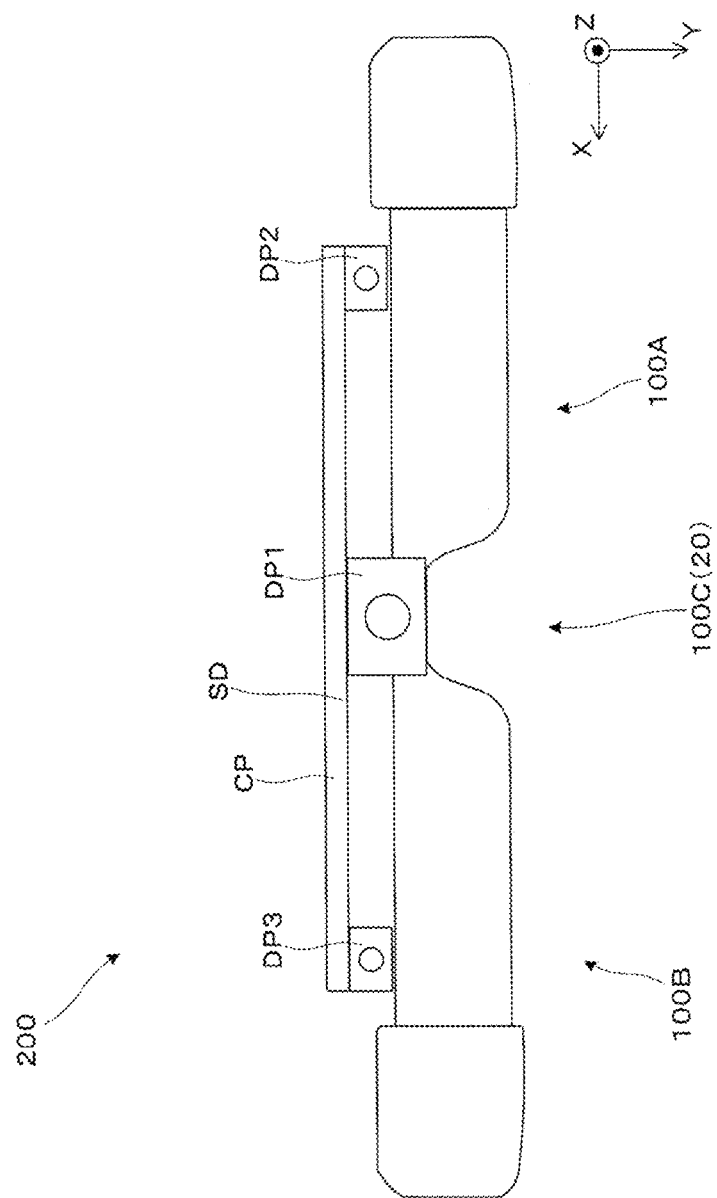
FIG. 12 is a conceptual front view for explaining an optical device according to a second exemplary embodiment.

FIG. 12 is a conceptual cross-sectional side view illustrating an appearance of an optical device 200 according to the present exemplary embodiment, and is a diagram corresponding to FIG. 2. In FIG. 12, a device is illustrated in which, in addition to the first and second display devices 100A and 100B, three number (a plurality) of detection units DP1, DP2, and DP3 are included as a space detection sensor SD.

The three detection units DP1, DP2, and DP3 constituting the space detection sensor SD are provided such that, with respect to a central detection unit DP1 that is centrally disposed, and by a coupling member CP extending in a left-right direction or a horizontal direction (the Y direction), a left-side detection unit DP2 and a right-side detection unit DP3 are provided at both ends of the coupling member CP respectively. In other words, the three detection units DP1, DP2, and DP3 constituting the space detection sensor SD are integrally coupled, and are disposed at positions separated from each other in the left-right direction respectively.

Various aspects of the configuration of the three detection units DP1, DP2, and DP3 are conceivable, but for example, the central detection unit DP1 may have a similar configuration to that of the camera CA of the first exemplary embodiment such that a visible light image can be imaged, on the other hand, the detection units DP2 and DP3 disposed on the left and right respectively may be infrared sensors, and receive reflected light such that a distance to an object can be measured (ranging). In this case, for example, for an object two-dimensionally reflected on an image of the external space acquired in the detection unit DP1, by utilizing measurement results using the detection units DP2 and DP3, stereoscopic space detection may be performed.

In the optical device 200 and a wearable display device provided with the same according to the present exemplary embodiment as well, the space detection sensor SD constituted by the plurality of detection units DP1, DP2, and DP3 integrally coupled and disposed at the respective positions separated from each other, is brought into contact with a positioning portion of a light-guiding member. This makes it possible to suppress occurrence of positional shifting between a result of space detection of the external space in the space detection sensor SD, and an image visible by imaging light guided by the transparent light-guiding unit 100C. In particular, in the present exemplary embodiment, by disposing the plurality of detection units DP1, DP2, and DP3 at the respective positions separated from each other, for example, stereoscopic (three-dimensional) space detection can be performed.

Modified Examples and Other Matters

The structure described above is exemplary, and various modifications can be made to the extent that similar functions can be achieved.

For example, in the first exemplary embodiment, the camera CA as the example of a space detection sensor, is the individual imaging element such as a CCD or a CMOS, for example, but various types of sensors including a camera of various aspects can be applied, as long as necessary space detection can be performed. For example, the camera CA may further have a zoom function, or may be configured by a rider or the like and perform ranging, to perform space detection. More specifically, for example, as a space detection sensor, a ranging sensor can be employed that uses various methods, such as by scanning with a laser beam, an extensive range is irradiated, reflected beam is detected when the laser beam hits an object and returns, and by measuring a distance to the object based on a period of time from the laser beam irradiation to the detection of the reflected beam, three-dimensional measurement is performed using a distance measurement sensor having a space recognition function, or the like. In addition, visible light as well as infrared light or the like may be received. In addition, as in the second exemplary embodiment, when the plurality of detection units (sensors) are used, distance information may be acquired using parallax by a plurality of cameras (stereo cameras). Also, various kinds of measures can be applied for the ranging, for example, using TOF (time of flight), and the like, is conceivable.

In addition, the central member 50 is configured so as to be smoothly coupled such that a bent portion (folded portion) is not included, but the present application can also be applied in a configuration in which a bent portion (folded portion) is included.

Additionally, since the central member 50 is accurately positioned and fixed with respect to the left and right light-guiding members 10a and 10b, the central member 50 may be used as a positioning reference for attaching the display element 80.

In the description above, the display element 80 is an organic EL display panel or a panel for LCD, but the display element 80 may be a self-luminous display element represented by an LED array, a laser array, a quantum dot light-emitting element, or the like. Further, the display element 80 may be a display using a laser scanner in which a laser light source and a scanner are combined. Note that, an LCOS (liquid crystal on silicon) technology can also be used, instead of an LCD panel.

Further, in the above description, the camera holder CH is used as the sensor fixing member, for example, for holding, storing or the like, to fix the camera CA to the light-guiding device 20, but the sensor fixing member may also be configured with a component other than the holder mechanism, as long as the camera can be fixed with desired accuracy. In other words, the sensor fixing member may fix the camera CA, by supporting the camera CA, sandwiching the camera CA with the central member 50 (coupling member), or the like.

As described above, optical device in one specific aspect includes a light-guiding member configured to guide imaging light, a positioning portion provided at the light-guiding member, a space detection sensor configured to perform space detection of an external space, and a sensor fixing member attached to the light-guiding member in contact with the positioning portion and configured to hold the space detection sensor.

In the optical device described above, the sensor fixing member that holds the space detection sensor contacts the positioning portion provided at the light-guiding member, so that high positional accuracy can be reliably maintained, when the space detection sensor is attached to the light-guiding member. This makes it possible to suppress occurrence of positional shifting between a result of space detection of the external space in the space detection sensor, and an image visible by imaging light guided by the light-guiding member. In this case, for example, when a display image is superimposed on an external space image viewed by the wearer using a see-through type, a state can be achieved in which respective positions of the external space image and a virtual image by the imaging light are highly consistent with each other.

In a specific aspect, a sensor cover is further included that cooperates with the sensor fixing member to clamp the space detection sensor therebetween. In this case, with the sensor fixing member and the sensor cover, the space detection sensor is fixed to a desired position.

In another aspect, a waterproofing member is further included that is provided between the sensor fixing member and the sensor cover, and is crimped in association with assembly of the sensor fixing member and the sensor cover. In this case, by providing the crimped waterproofing member, it is possible to maintain sealing performance of an inside in which the space detection sensor is housed.

In yet another aspect, the sensor fixing member is a member obtained by integrally molding the attachment portion that is attached in contact with the positioning portion, and the storage portion that houses the space detection sensor. In this case, positional accuracy of the space detection sensor and the light-guiding member via the sensor fixing member can be maintained to be high.

In yet another aspect, the space detection sensor includes a camera that images an external space image. In this case, space detection of the external space can be performed based on an image imaged by the camera.

In yet another aspect, the light-guiding member includes a first light-guiding member and a second light-guiding member provided corresponding to the left and right eyes respectively, and the positioning portion is provided between the first light-guiding member and the second light-guiding member. In this case, the positioning portion and the space detection sensor can be brought closer to each other to further reduce a tolerance.

In yet another aspect, the positioning portion is provided at a central position about which the first light-guiding member and the second light-guiding member are bilaterally symmetric. In this case, the positioning portion can be disposed with high accuracy at a center of left and right image display.

In yet another aspect, the light-guiding member includes a coupling member that couples the first light-guiding member and the second light-guiding member, and the positioning portion is provided at the coupling member. In this case, the positioning portion can be easily and reliably provided between the first light-guiding member and the second light-guiding member.

In yet another aspect, the positioning portion is a convex portion extending in a lateral direction in which the first light-guiding member and the second light-guiding member are aligned. In this case, a surface of the convex portion can be used as a reference surface for positioning.

In yet another aspect, the coupling member forms an indented portion bored between the first light-guiding member and the second light-guiding member, and the positioning portion is provided at a bored side in the indented portion. In this case, with the indented portion, the space detection sensor together with a nose pad and the like can be provided, and strength can be maintained by the convex portion. Also, for example, a situation can be avoided or suppressed in which stray light occurs at the convex portion, for example, by unintended reflection of imaging light for image display, outside light, and the like.

In yet another aspect, the positioning portion is provided at a surface that is not a surface of the light-guiding member contributing to light-guiding of imaging light, and is a surface deviated from an extension of the light-guiding. In this case, occurrence of stray light caused by the imaging light at the convex portion can be avoided or suppressed.

In yet another aspect, the space detection sensor includes a plurality of detection units that are integrally coupled and disposed at positions separated from each other, and performs stereoscopic space detection. In this case, the stereoscopic space detection using the plurality of detection units can be performed.

In yet another aspect, the sensor fixing member is a pad support device that supports a nose pad. In this case, the sensor fixing member supports the nose pad as well, and a size and weight of the device can be reduced.

Further, a wearable display device according to one specific aspect is provided with the optical device described in any of the above aspects.

In the wearable display device described above, the sensor fixing member that holds the space detection sensor contacts the positioning portion provided at the light-guiding member, so that high positional accuracy can be reliably maintained, when the space detection sensor is attached to the light-guiding member. This makes it possible to suppress occurrence of positional shifting between a result of space detection of the external space in the space detection sensor, and an image visible by imaging light guided by the light-guiding member. In this case, for example, when a display image is superimposed on an external space image viewed by the wearer using a see-through type, a state can be achieved in which respective positions of the external space image and a virtual image by the imaging light are highly consistent with each other.

What is claimed is:

1. An optical device, comprising:
   a light-guiding member configured to guide imaging light;
   a positioning portion provided at the light-guiding member;
   a space detection sensor configured to perform space detection of an external space; and
   a sensor fixing member attached to the light-guiding member in contact with the positioning portion and configured to hold the space detection sensor,
   wherein the sensor fixing member is a member obtained by integrally molding an attachment portion that is attached in contact with the positioning portion, and a storage portion that houses the space detection sensor.

2. The optical device according to claim 1, further comprising
   a sensor cover configured to cooperate with the sensor fixing member to clamp the space detection sensor therebetween.

3. The optical device according to claim 2, further comprising
   a waterproofing member provided between the sensor fixing member and the sensor cover, and crimped in association with assembly of the sensor fixing member and the sensor cover.

4. The optical device according to claim 1, wherein
   the space detection sensor includes a camera that images an external space image.

5. The optical device according to claim 1, wherein
   the light-guiding member includes a first light-guiding member and a second light-guiding member provided corresponding to left and right eyes respectively, and
   the positioning portion is provided between the first light-guiding member and the second light-guiding member.

6. The optical device according to claim 5, wherein
   the positioning portion is provided at a central position about which the first light-guiding member and the second light-guiding member are bilaterally symmetric.

7. The optical device according to claim 5, wherein
   the light-guiding member includes a coupling member that couples the first light-guiding member and the second light-guiding member, and the positioning portion is provided at the coupling member.

8. The optical device according to claim 7, wherein
   the positioning portion is a convex portion extending in a lateral direction in which the first light-guiding member and the second light-guiding member are aligned.

9. The optical device according to claim 7, wherein
   the coupling member forms an indented portion bored between the first light-guiding member and the second light-guiding member, and
   the positioning portion is provided at a bored side in the indented portion.

10. The optical device according to claim 1, wherein
    the positioning portion is provided at a surface that is not a surface of the light-guiding member contributing to light-guiding of the imaging light, and is a surface deviated from an extension of the light-guiding.

11. The optical device according to claim 1, wherein
    the space detection sensor includes a plurality of detection units that are integrally coupled and disposed at positions separated from each other, and performs stereoscopic space detection.

12. A wearable display device, comprising the optical device according to claim 1.

13. An optical device, comprising:
    a light-guiding member configured to guide imaging light;

a positioning portion provided at the light-guiding member;
a space detection sensor configured to perform space detection of an external space; and
a sensor fixing member attached to the light-guiding member in contact with the positioning portion and configured to hold the space detection sensor,
wherein the sensor fixing member is a pad support device that supports a nose pad.

* * * * *